United States Patent
Piontek

(10) Patent No.: US 7,686,108 B2
(45) Date of Patent: Mar. 30, 2010

(54) ELECTRICALLY RELEASED PARKING BRAKE FOR ZERO TURN RADIUS MOWER

(75) Inventor: Alan F. Piontek, Lincoln, NE (US)

(73) Assignee: Great Plains Manufacturing, Inc., Salina, KS (US)

( * ) Notice: Subject to any disclaimer, the term of this patent is extended or adjusted under 35 U.S.C. 154(b) by 488 days.

(21) Appl. No.: 11/673,311

(22) Filed: Feb. 9, 2007

(65) Prior Publication Data

US 2008/0190084 A1   Aug. 14, 2008

(51) Int. Cl.
B62D 11/02   (2006.01)
(52) U.S. Cl. ........................ 180/6.48; 180/6.2
(58) Field of Classification Search ............... 180/6.2, 180/6.48; 56/10.2, 11.3; 340/457.3
See application file for complete search history.

(56) References Cited

U.S. PATENT DOCUMENTS

| | | | |
|---|---|---|---|
| 3,942,602 A | | 3/1976 | Case et al. |
| 5,496,226 A | * | 3/1996 | Splittstoesser et al. ........ 476/24 |
| 5,502,957 A | * | 4/1996 | Robertson ................... 56/11.9 |
| 5,507,138 A | | 4/1996 | Wright et al. |
| 5,600,944 A | | 2/1997 | Wright et al. |
| 5,765,347 A | | 6/1998 | Wright et al. |
| 5,809,755 A | | 9/1998 | Velke et al. |
| 5,984,031 A | | 11/1999 | Velke et al. |
| 6,056,074 A | | 5/2000 | Heal et al. |
| 6,059,055 A | | 5/2000 | Velke et al. |
| 6,094,897 A | | 8/2000 | Velke et al. |
| 6,138,446 A | | 10/2000 | Velke et al. |
| 6,189,304 B1 | | 2/2001 | Velke et al. |
| 6,276,486 B1 | | 8/2001 | Velke et al. |
| 6,301,864 B1 | * | 10/2001 | Damie et al. ................. 56/11.3 |
| 6,327,839 B1 | | 12/2001 | Velke et al. |
| 6,343,668 B1 | * | 2/2002 | Dean .......................... 180/315 |
| 6,390,225 B2 | | 5/2002 | Velke et al. |
| 6,434,917 B1 | | 8/2002 | Bartel |
| 6,516,596 B2 | | 2/2003 | Velke et al. |
| 6,550,563 B2 | | 4/2003 | Velke et al. |
| 6,688,090 B2 | * | 2/2004 | Velke et al. .................. 56/14.7 |
| 6,729,115 B2 | * | 5/2004 | Bartel ......................... 56/11.3 |
| 6,912,831 B2 | * | 7/2005 | Velke et al. .................. 56/10.9 |
| 2004/0124697 A1 | * | 7/2004 | MacGregor et al. ........... 303/89 |
| 2008/0111342 A1 | * | 5/2008 | Niekerk et al. .............. 280/261 |

* cited by examiner

*Primary Examiner*—Lesley Morris
*Assistant Examiner*—Michael R Stabley
(74) *Attorney, Agent, or Firm*—Hovey Williams LLP

(57) ABSTRACT

The parking brakes at the drive wheels of a zero turning radius mower are automatically set when a pair of drive levers used for determining speed, steering and forward or reverse travel are placed in their neutral positions and swung outwardly to widespread, operator dismount positions. When the drive levers are widespread, switches associated with a control circuit are opened, allowing air cylinders to immediately exhaust pressurized air so that tension springs may actuate the brake assemblies to set the brakes. When the drive levers are returned to their operating modes and the ignition is turned on, the control switches are closed, energizing the control circuit to pressurize the air cylinders and release the brakes against the bias of the tension springs.

10 Claims, 11 Drawing Sheets

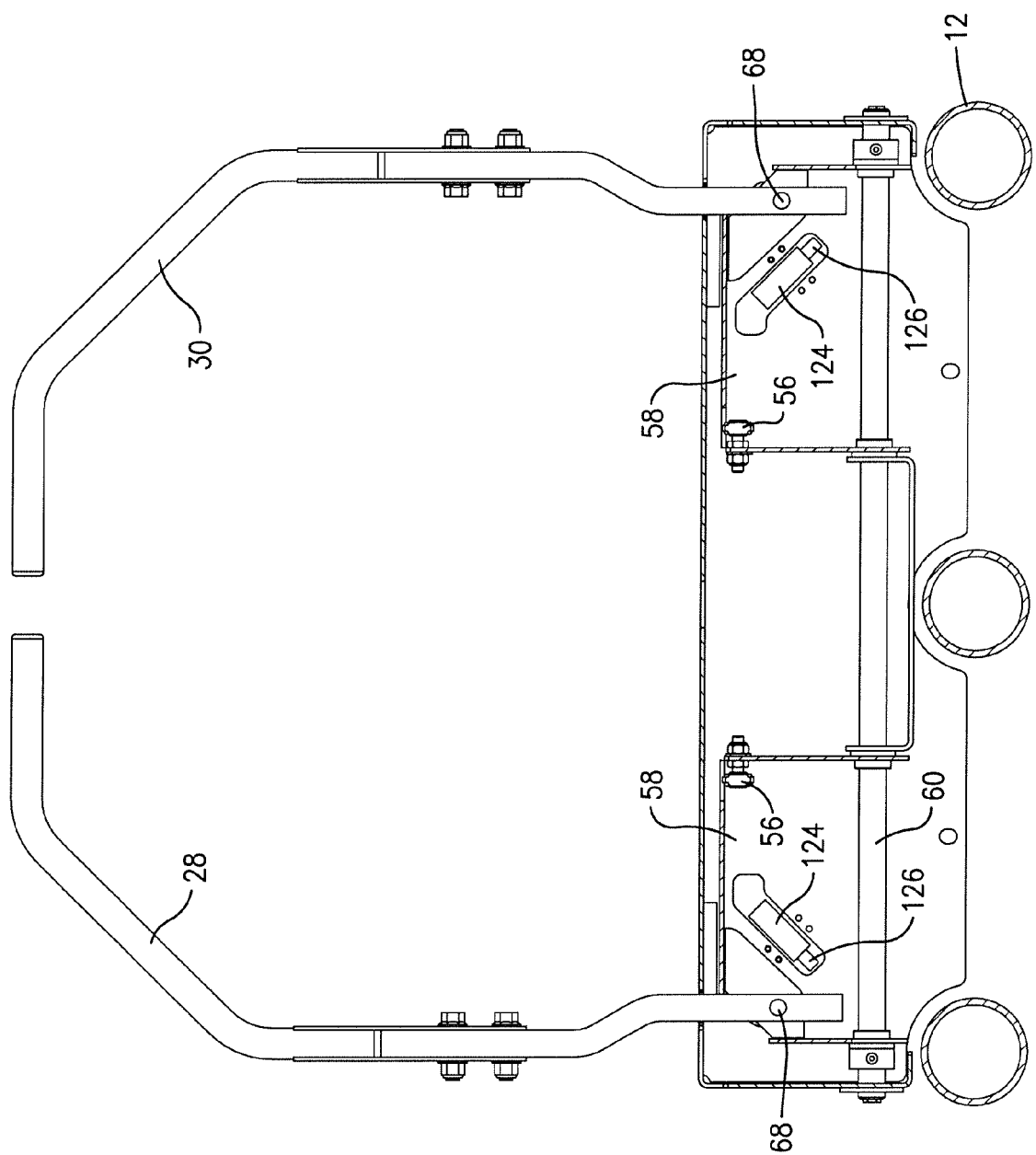

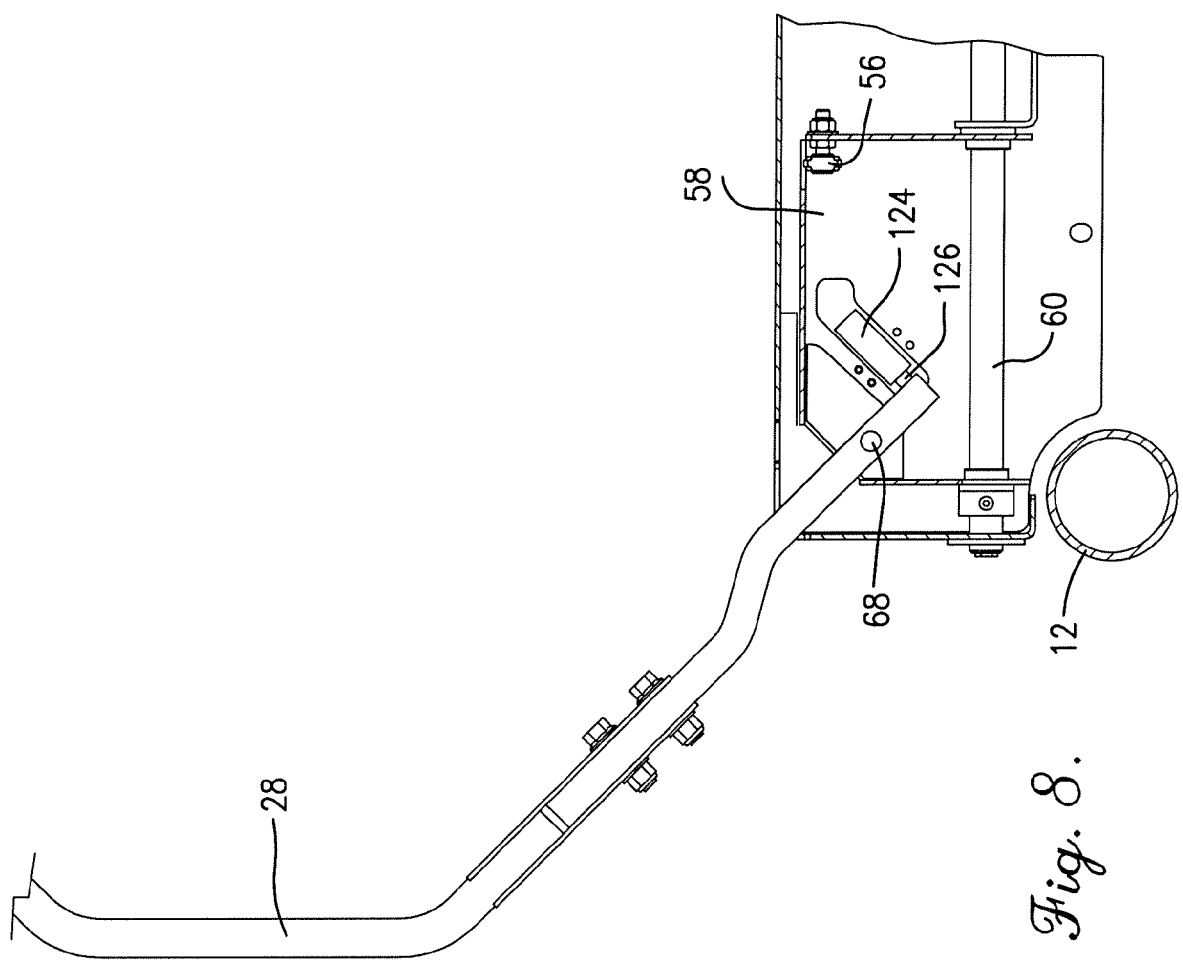

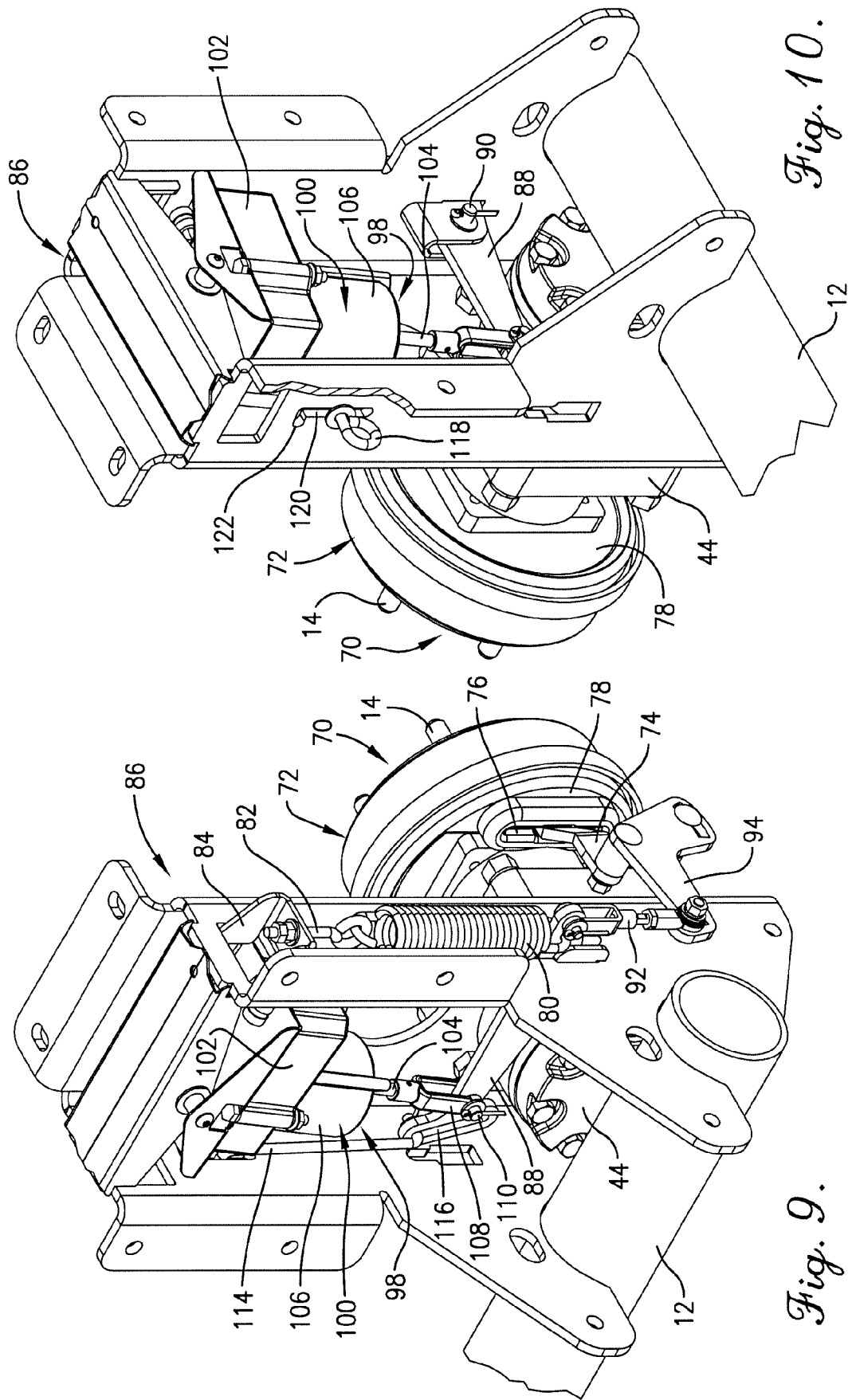

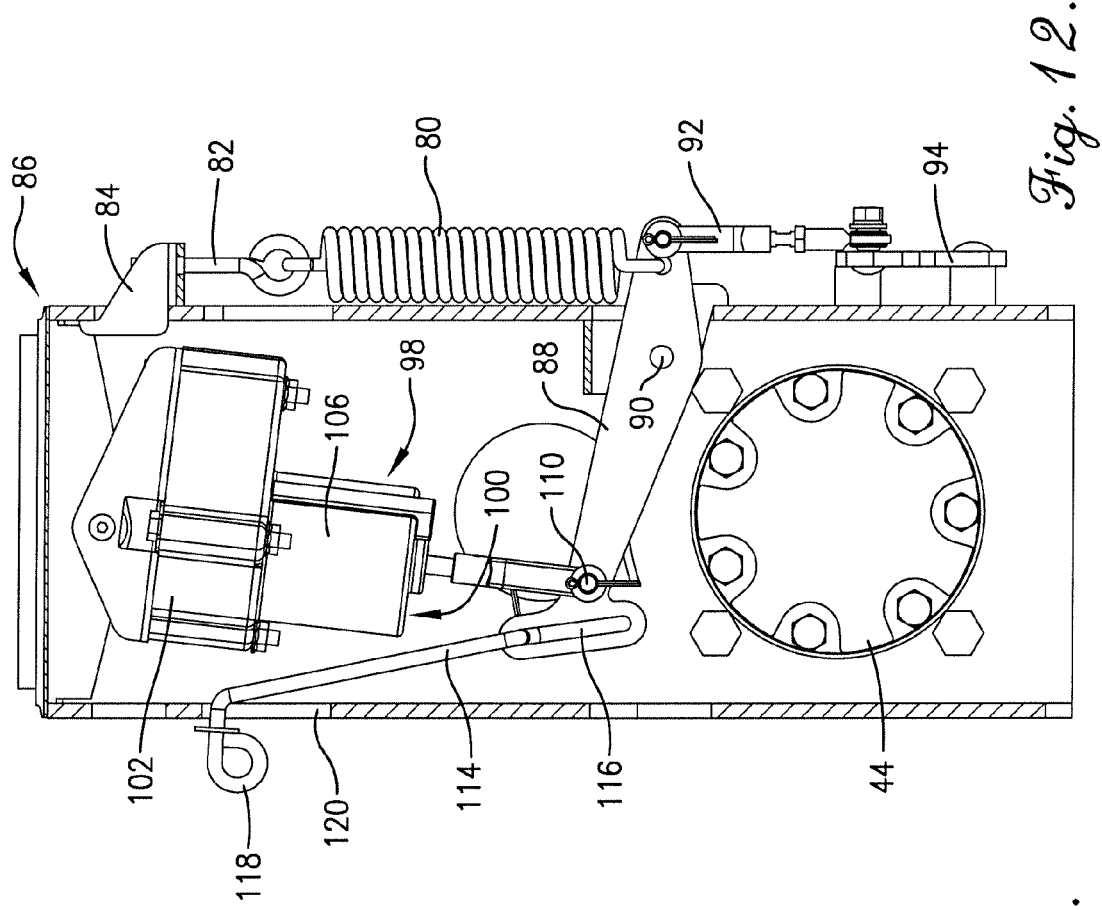
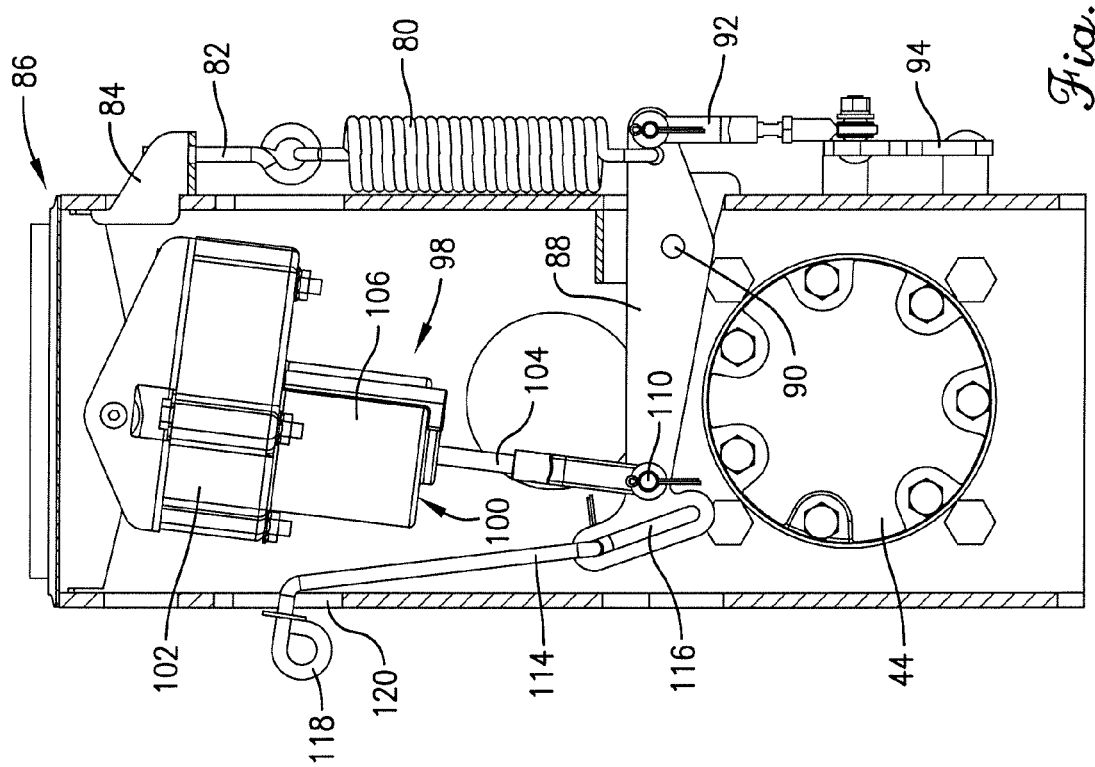

ELECTRICALLY RELEASED PARKING BRAKE FOR ZERO TURN RADIUS MOWER

TECHNICAL FIELD

The present invention relates to zero turning radius riding mowers of the type in which the seated driver controls speed, turning and forward/reverse travel by appropriately manipulating a pair of drive levers adjacent the seat. More particularly, it relates to a way of automatically applying parking brakes or other wheel retaining mechanism when the ignition is turned off or the drive levers are swung outwardly to their widespread positions for operator dismount.

BACKGROUND AND SUMMARY OF THE INVENTION

Zero turning radius mowers are typically provided with twin drive levers that are manipulated by the seated operator to regulate the speed, turning, and forward or reverse operations of the mower. In a typical such mower, the ground-engaging drive wheels utilize reversible hydraulic motors that are supplied with hydraulic fluid in variable amounts by pumps linked to the drive levers. Steering of the machine is accomplished by speeding up or slowing down one of the hydraulic motors relative to the other through the appropriate manipulation of the drive levers. In some instances, one of the motors may be reversed relative to the other to turn the machine about a zero turning radius. Mechanical drive mechanisms have also been utilized in lieu of the hydraulic pumps and motors.

The drive levers are moveable independently of one another along fore-and-aft paths of travel to control the pumps and hydraulic motors. However, when the levers are aligned with one another in side-by-side relationship in neutral, they can be swung outwardly to widespread positions to make it more convenient for the operator to dismount the mower. In the present invention, through use of an electrical control circuit, swinging of the drive levers to their widespread positions causes the parking brakes or other wheel retaining mechanisms to be automatically applied, holding the mower against further movement. The electrical control circuit is also such that when the ignition is turned off for any reason, even if the drive levers are not in their widespread positions, the parking brake or retaining mechanism will be automatically applied as a safety means.

BRIEF DESCRIPTION OF THE DRAWINGS

FIG. 7 is a vertical, transverse cross-sectional view through the mower chassis looking forwardly from a point just rearward of the drive levers;

FIG. 8 is a fragmentary, vertical, transverse cross-sectional view through the mower chassis similar to FIG. 7 but showing the left drive lever swung out to its widespread position;

FIG. 9 is a fragmentary, front isometric view of the left wheel support tower and brake assembly;

FIG. 10 is a fragmentary, rear isometric view of the left wheel support tower and brake assembly;

FIG. 11 is a vertical cross-sectional view of the left wheel support tower and brake assembly with the brake assembly in an applied or set condition;

FIG. 12 is a vertical cross-sectional view of the left wheel support tower and brake assembly similar to FIG. 11 but with the brake assembly released;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
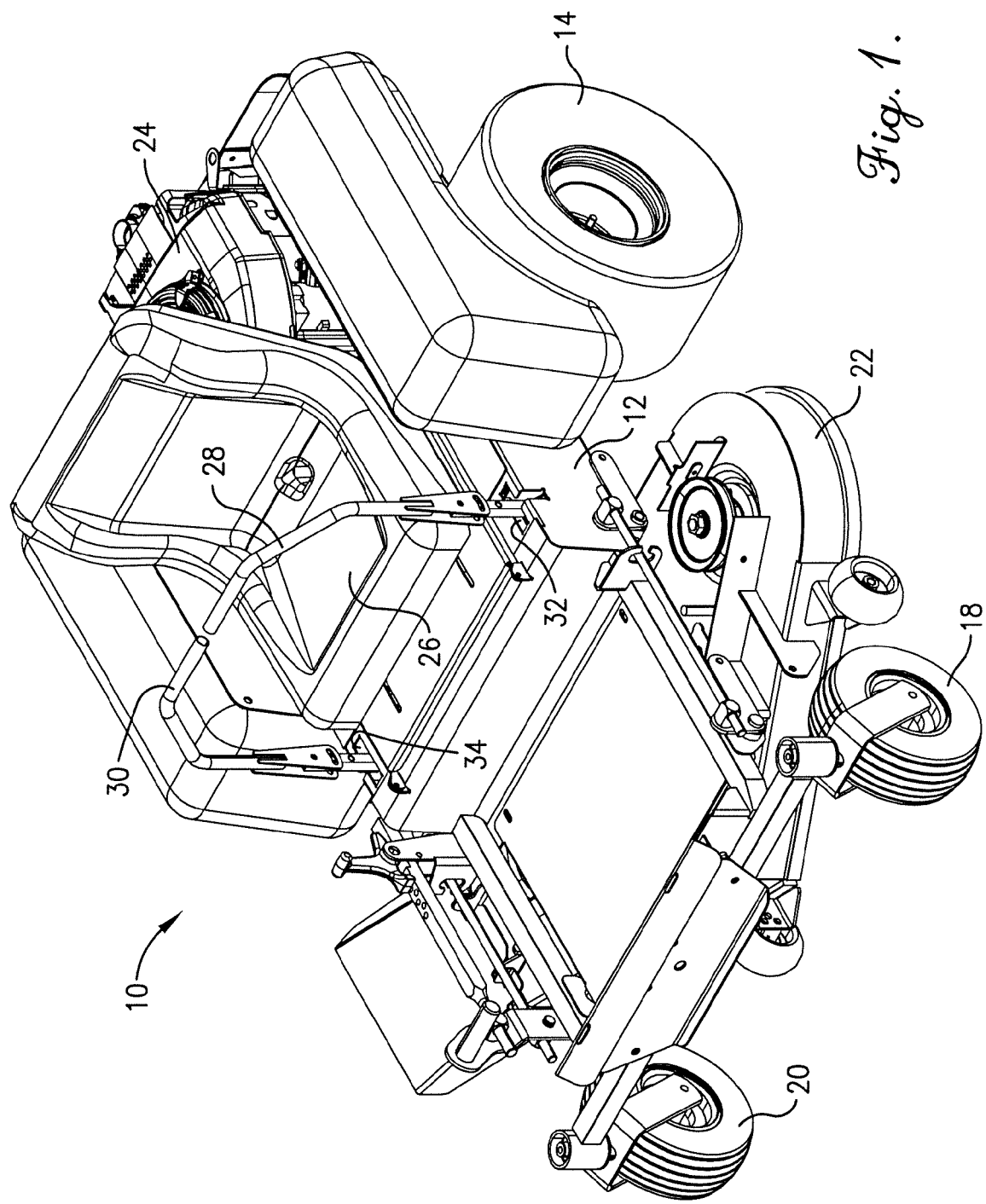
FIG. 1 is a left, front isometric view of a zero turning radius mower incorporating the principles of the present invention.
Figure 2:
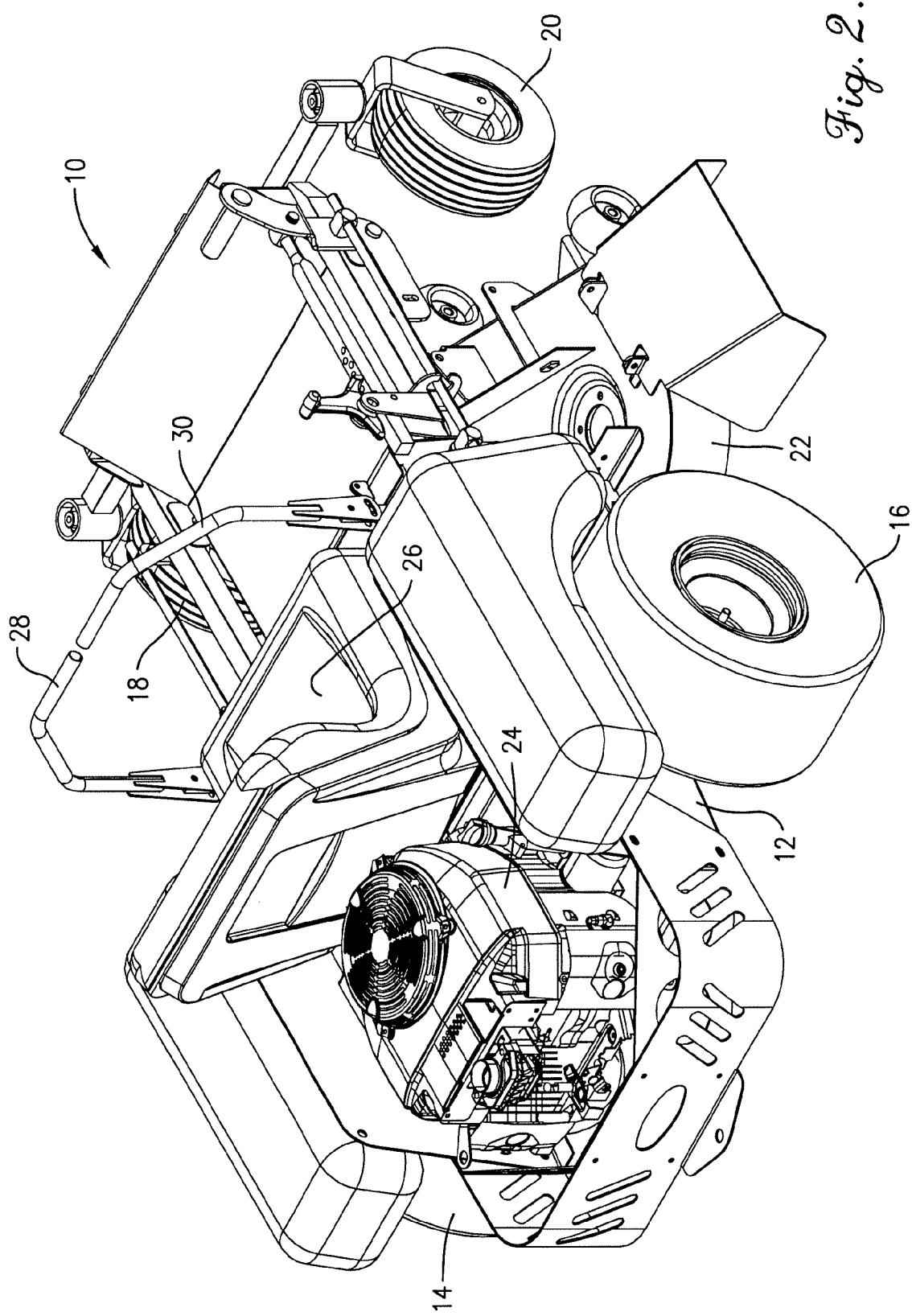
FIG. 2 is a right, rear isometric view of the mower.

Referring initially to FIGS. 1 and 2, a mower incorporating the principles of the present invention is depicted therein and indicated by the numeral 10. Mower 10 includes a mobile chassis 12 supported by a pair of ground-engaging drive wheels 14, 16 at the rear of the mower and a pair castor wheels 18, 20 at the front of the machine. A mower deck 22 is suspended under the belly of the machine. A gasoline engine 24 or other type of prime mover is supported on chassis 12 at the rear of the machine for supplying driving power to drive wheels 14, 16 and the cutter blade or blades (not shown) associated with mower deck 22.

Figure 3:
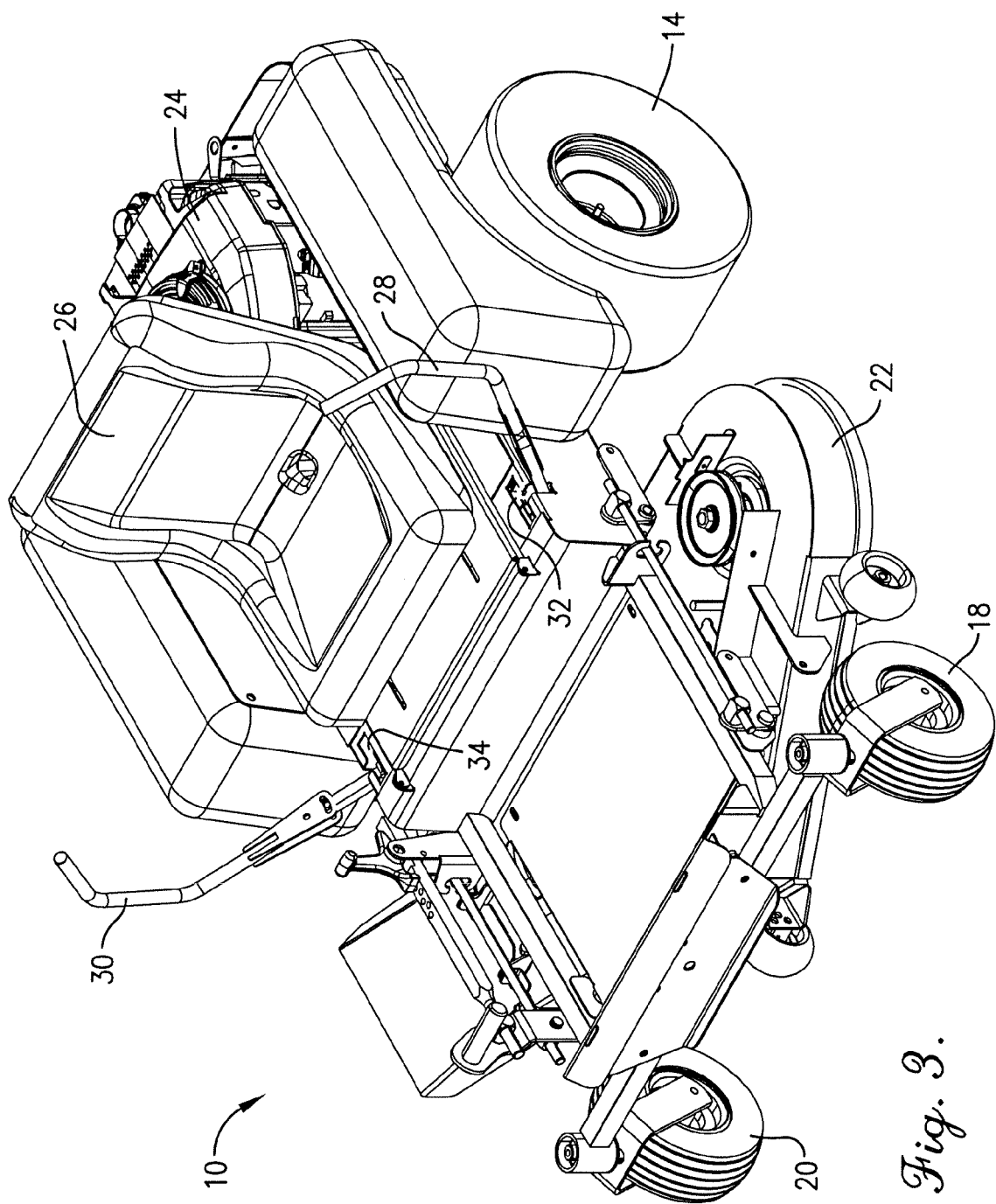
FIG. 3 is a left, front isometric view of the mower as in FIG. 1 but showing the drive levers swung out to their widespread positions for dismounting.
Figure 5:
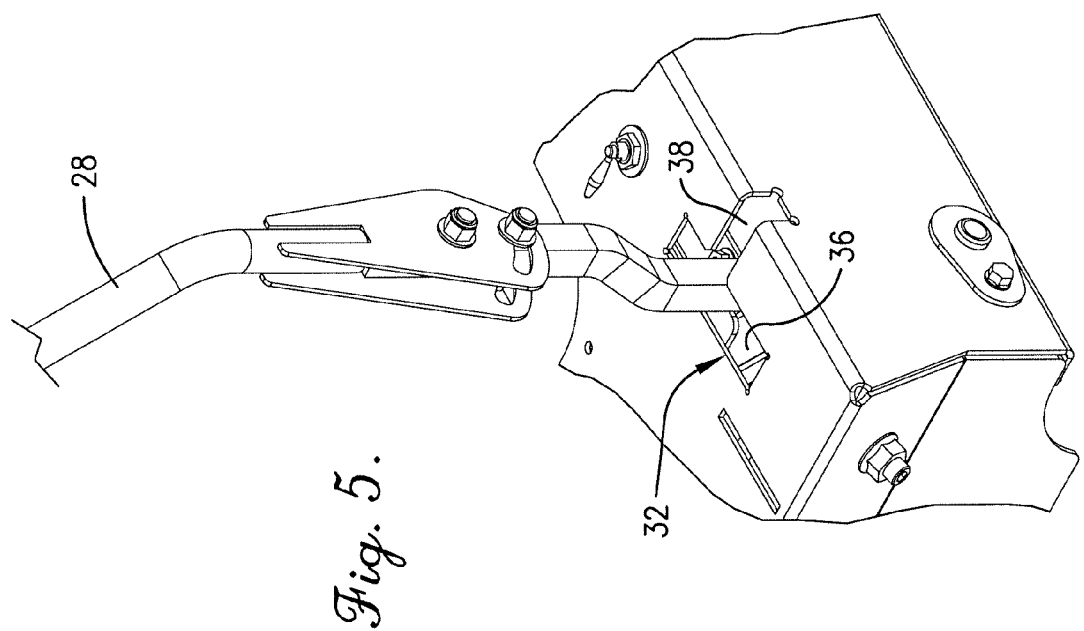
FIG. 5 is an enlarged, fragmentary, left front isometric view of the left drive lever illustrating its relationship with the T-shaped guide slot in the floor panel of the mower.

An operator's seat 26 is supported on chassis 12 in front of engine 24 in such a position that an operator sitting on seat 26 can readily grasp a pair of drive levers 28 and 30 for controlling speed, turning, and forward or reverse travel of the mower. Levers 28 and 30 are moveable independently of one another along fore-and-aft paths of travel within respective T-shaped slots 32 and 34 in chassis 12 for accomplishing such control in a well-known manner. Fore-and-aft or longitudinal legs 36 (FIG. 5) of T-slots 32, 34 limit levers 28,30 to fore-and-aft movement through forward, neutral and reverse modes, but transverse legs 38 at the mid-point of the fore-and-aft legs 36 (corresponding to the neutral position of levers 28, 30) permit the levers to be swung out to their widespread positions as illustrated in FIG. 3 to facilitate mounting and dismounting by the operator.

Figure 4:
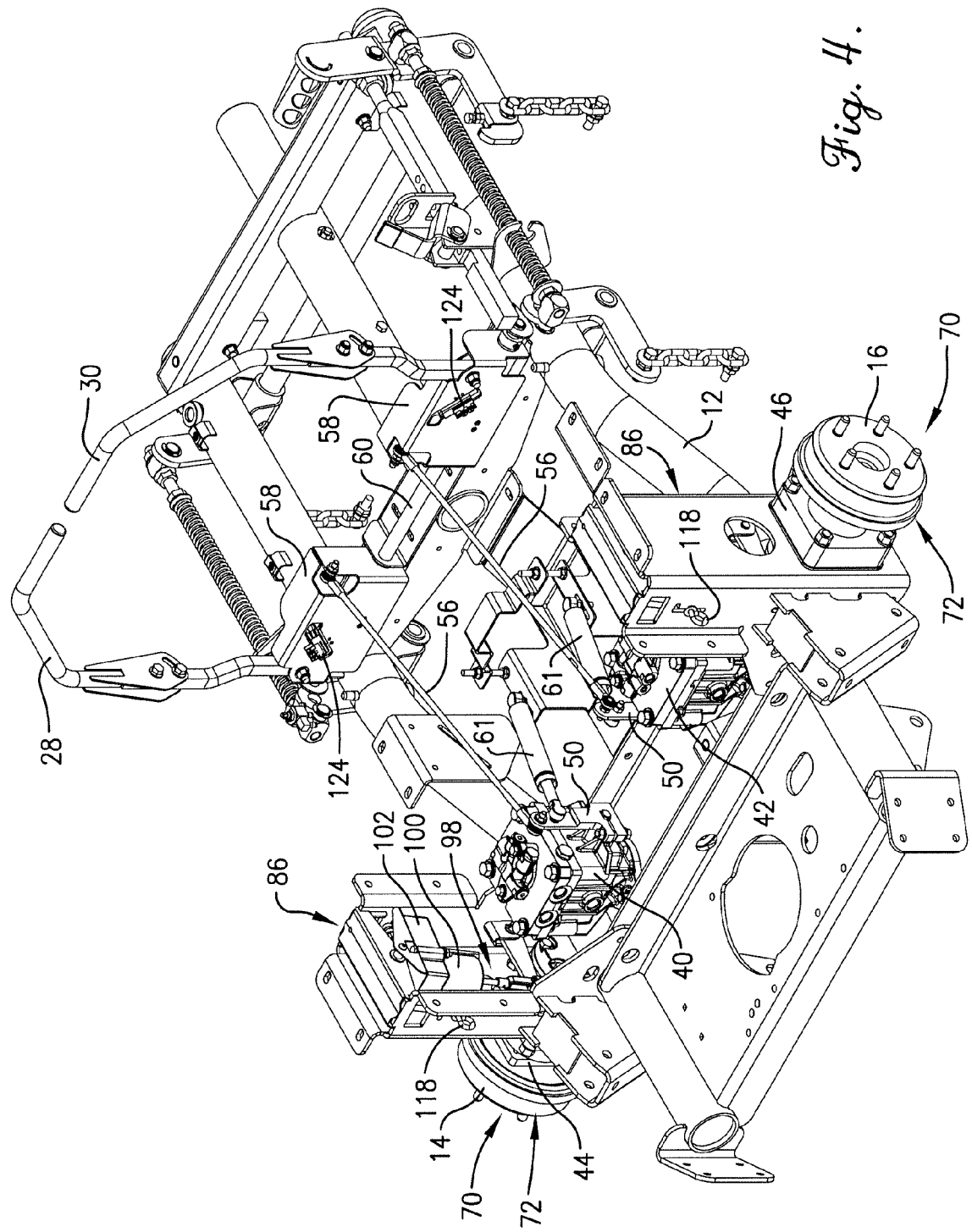
FIG. 4 is a right, rear isometric view of the mower with wheels and other exterior structure removed to reveal internal details of construction.

Mower 10 may be provided with mechanical drive mechanism operably interconnecting the output shaft (not shown) of engine 24 with drive wheels 14, 16. However, in a preferred embodiment the engine output shaft is connected with a pair of hydraulic pumps 40 and 42 (FIG. 4) that supply hydraulic fluid to a pair of reversible hydraulic motors 44 and 46 operably connected with respective ones of the drive wheels 14, 16. The volume and direction of hydraulic flow from the pumps 40, 42 is regulated by an internal swash plate (not shown) in each pump whose position is controlled by a lever 50. Levers 50 are operated by a pair of fore-and-aft extending control links 56 that are operably connected at their front ends to a pair of inverted, box-like brackets 58 that support the drive levers 28, 30. Brackets 58 are independently mounted on a stationary cross shaft 60 for rotational movement relative to the shaft 60 about the longitudinal axis thereof. Thus, as levers 28, 30 are moved by the operator in fore-and-aft paths of travel, they swing or pivot brackets 58 about shaft 60 to operate pumps 40, 42. A pair of dampeners 61 are connected between chassis 12 and the operating levers 50 of pumps 40, 42 to provide a measure of resistance to movement of levers 50.

Figure 6:
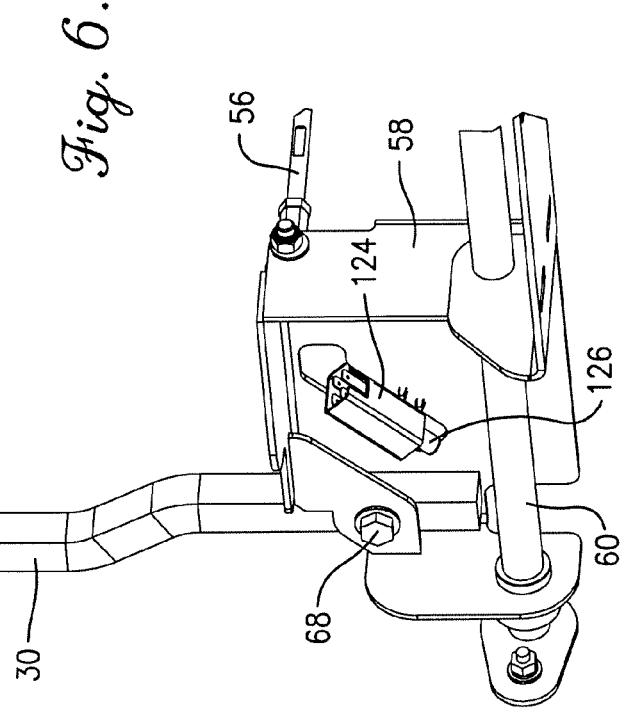
FIG. 6 is an enlarged, fragmentary, left front isometric view of the right drive lever and its electrical brake switch for releasing or setting the right wheel brake.

Each of the drive levers 28, 30 is pivotally attached to its corresponding support bracket 58 by a fore-and-aft pivot 68 (FIGS. 6, 7, and 8). The pivots 68 thus permit levers 28, 30 to swing laterally in and out when levers 28, 30 are in the neutral position of FIG. 1 in which they are aligned with transverse legs 38 of T-slots 32, 34.

At least one of the drive wheels 14, 16, and preferably both, is provided with retaining mechanism broadly identified by the numeral 70 (detailed in FIGS. 6, 7 and 8) for selectively, releasably holding the drive wheel against rotation. Each retaining mechanism 70 may take a variety of different forms including, for example, a lockable park mechanism including interengageable mechanical locking components, or a parking brake. In the illustrated and preferred embodiment, each retaining mechanism 70 takes the form of a parking brake 72, which is preferably a friction brake. An actuator lever or member 74 projects through an upright slot 76 in a stationary rear wall 78 of brake 72 and is moveable up and down between an upper, actuated position in which a braking force is applied to hold the drive wheel against rotation, and a lower released position in which the braking force is released from the wheel to permit it to rotate. In one preferred form of the invention each brake, hydraulic motor, and drive wheel hub may comprise an integrated unit such as that available from White Hydraulics, Inc. of Hopkinsville, Ky. as a Model CE motor/brake.

Retaining mechanism 70 further includes a tension spring 80 operably coupled with brake member 74 in a manner to yieldably bias member 74 toward its raised actuated position, thus applying the brake. Tension spring 80 is connected at its upper end to an adjustable eye-bolt 82 that is secured to a mounting bracket 84 on the outside of an upright, formed metal, generally channel-shaped tower 86 that is secured to and forms a part of chassis 12. The lower end of tension spring 80 is connected to the outer end of a generally horizontally extending lever 88 that is pivotally mounted to tower 86 by a transverse pivot 90. Spring 80 thus yieldably biases the outer end of lever 88 upwardly. Also coupled with the outer end of lever 88 is an adjustable, upright turnbuckle 92 that is connected at its lower end with an inverted, generally L-shaped bracket 94 fixed to brake member 74. Lever 88, link 92 and bracket 94 thus transmit the biasing force of spring 80 to the member 74 to apply a braking force to the drum of brake 72.

Figure 13:
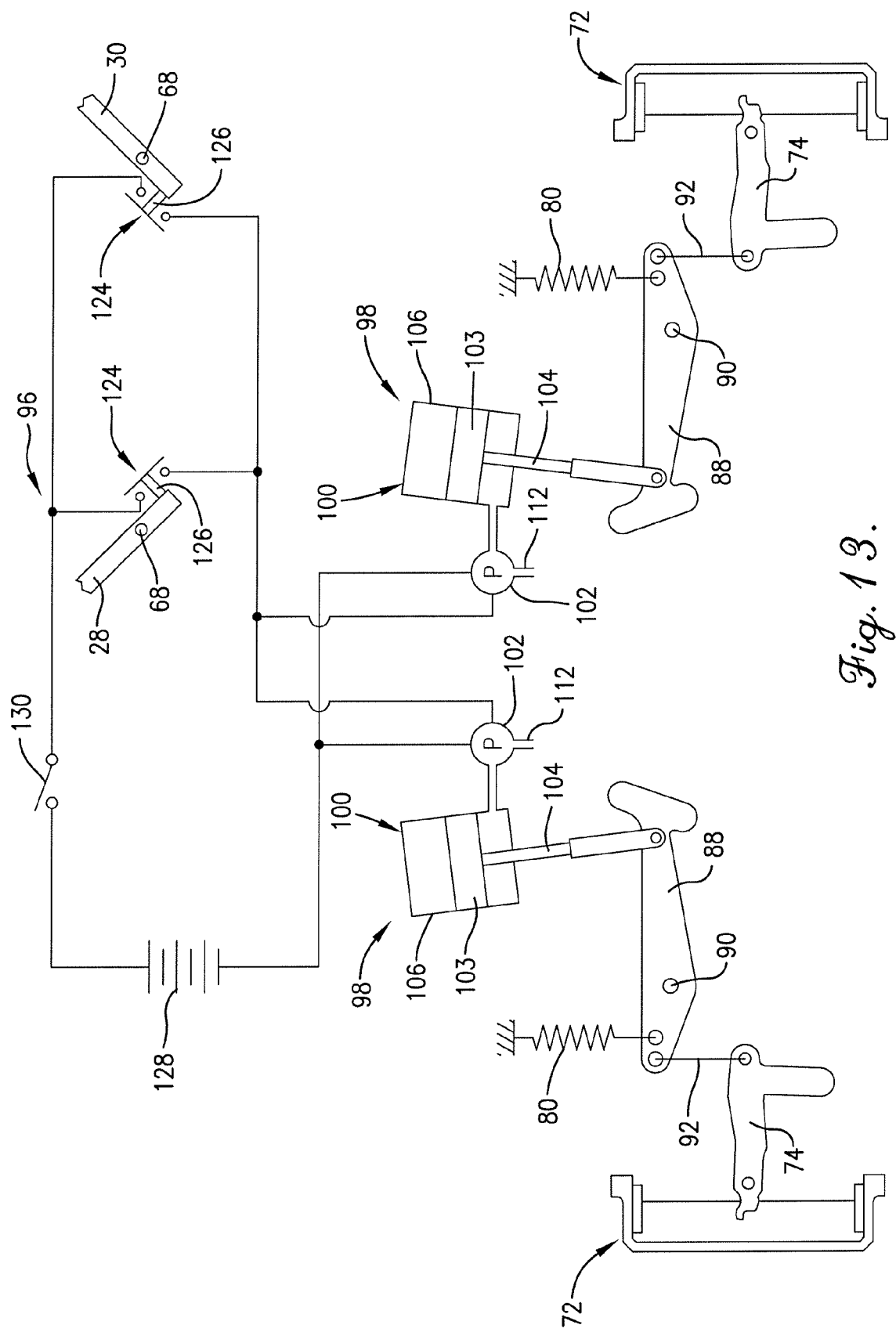
FIG. 13 is a schematic illustration of the electrical control circuit for the brakes of the mower showing the brakes in an applied or set condition.
Figure 14:
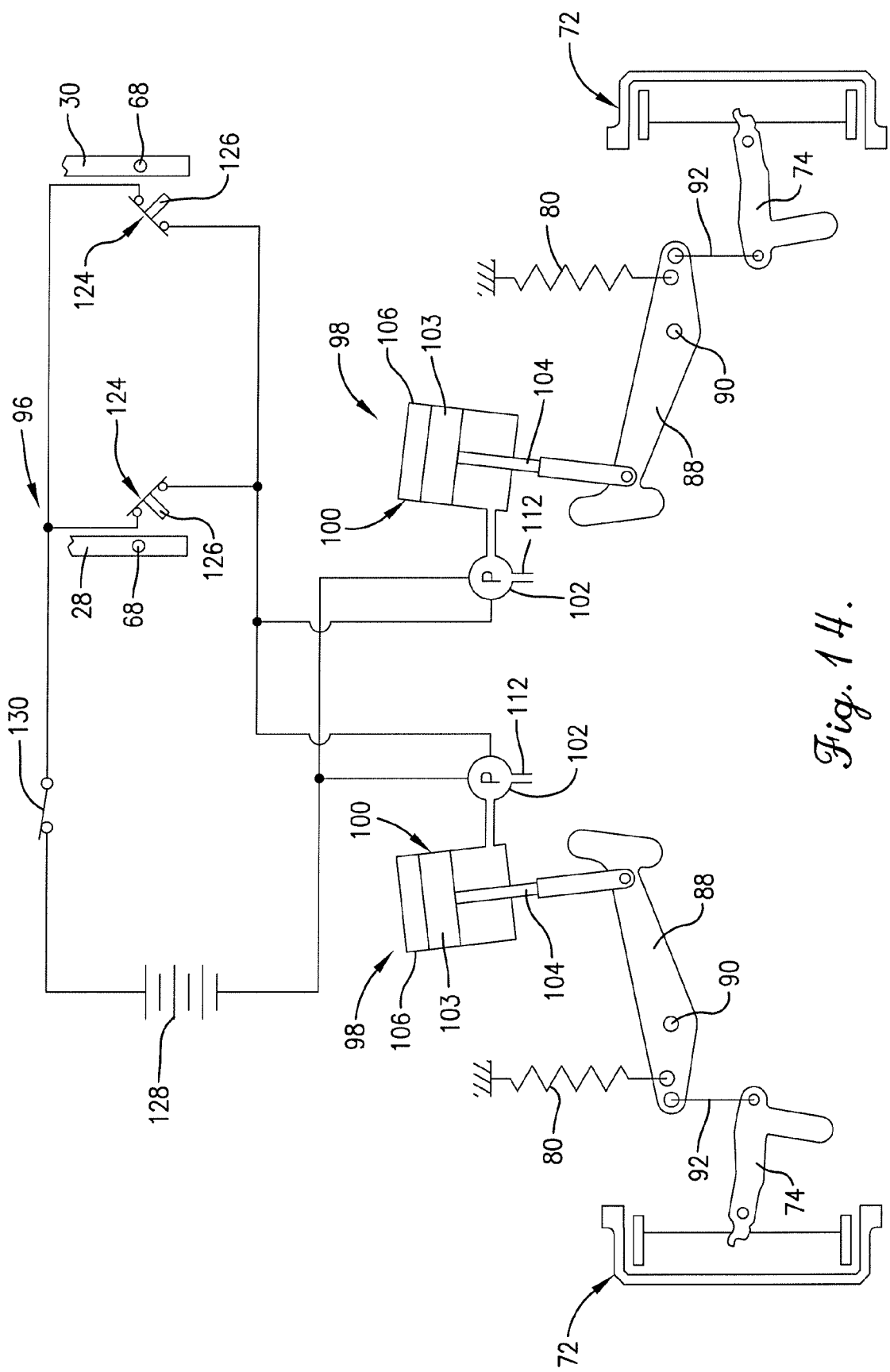
FIG. 14 is a schematic illustration of the electrical control circuit for the brakes of the mower showing the brakes released.

An electric control circuit 96, shown schematically in FIGS. 13 and 14, is provided for electrically releasing and applying the parking brake 72. As noted above, it is within the scope of the present invention to provide only one of the drive wheels 14, 16 with a retaining mechanism 70, in which case control circuit 96 would be operative to control only the one mechanism. However, in a preferred embodiment, both of the drive wheels 14, 16 are provided with retaining mechanisms, preferably in the form of parking brakes 72 as illustrated in the drawings, and control circuit 96 is operable to control both parking brakes 72.

One primary component of control circuit 96 is an electrically powered control device 98 for each wheel 14, 16, such device 98 being mounted on and supported by the support tower 86 associated with that wheel. Each control device 98 includes, in one preferred form, a single-acting air cylinder 100 powered by a pump 102. In a preferred form, the air cylinder 100 and pump 102 are integrated into a single unit such as that available from North American Clutch Corporation of Milwaukee, Wis. as NORAM brand part number 700A020.

Each air cylinder 100 includes a ram or piston 103 (FIGS. 13 and 14) that has a rod 104 projecting downwardly from the cylindrical housing 106 of the cylinder. At its lower end, rod 104 is provided with a clevis 108 that connects to the inboard end of lever 88 via a pivot 110. Thus, when pressurized air is introduced into the rod end of housing 106 from pump 102, rod 104 is retracted, causing lever 88 to be lifted, which forces the outer end of lever 88 downwardly against the resistance of brake spring 80. This motion thus pushes brake lever member 74 downwardly within slot 76 via turnbuckle 92 and releases the brake 72 (FIG. 12). On the other hand, when pressurized air within housing 106 is exhausted via an electrically valved exhaust port 112 associated with pump 102, such release of air pressure allows spring 80 to pull upwardly against the outer end of lever 88, applying the brake 72 and lowering the inner end of lever 88 as it causes rod 104 to extend (FIG. 11).

When air cylinder 100 is electrically energized, it retracts piston rod 104 and releases the brake 72. An electrically controlled valve (not shown) associated with exhaust port 112 helps hold sufficient air pressure within housing 106 as to maintain rod 104 retracted such that the motor of pump 102 need not be constantly running during the time that pressurized air maintains piston rod 104 retracted. When air cylinder 100 is de-energized, the valve of exhaust port 112 opens to set the brake.

Provision is made to manually release the brake 72 and releasably maintain it in a released condition in the event that control device 98 is disabled or it is simply desired to maintain the brake released for any other reason, such as while the mower is being serviced. To this end, lever 88 is provided with a manual retaining rod 114 connected to the inner end of lever 88 via a generally upright slot 116 in lever 88. At its upper end, retaining rod 114 is joggled outwardly and passes through the proximal side wall of tower 86 to terminate in a finger loop 118. The upper end of retaining rod 114 is received within a vertical slot 120 in the proximal side wall of tower 86 so that link 114 may be manually grasped and pulled upwardly to the upper limit of slot 120. In such position, the rod 114 may be pushed to one side in a transverse leg 122 of slot 120 so as to releasably hold rod 114 in its upwardly raised position. Thus, by pulling upwardly on retaining rod 114 when the brake is in an applied condition, the brake 72 will become released as the inner end of lever 88 is swung upwardly by rod 114. By then temporarily pushing rod 114 into transverse leg 122, rod 114 will remain fully raised with the brake released and piston rod 104 retracted into housing 106.

Normally, retaining rod 114 is out of the transverse leg 122 of slot 120 and is resting on the bottom of slot 120. Under such conditions, the vertical slot 116 in lever 88 serves as a lost motion connection with rod 114 and permits piston rod 104 to retract and extend without causing manipulation of retaining rod 114. Of course, retaining rod 114 may also be pulled upwardly and hooked over the edge of transverse leg 122 when the brake is already in a released condition with piston rod 104 retracted into cylinder 100, thereby avoiding the need to manually overpower the spring 80.

Control circuit 96 further includes a pair of normally closed switches 124 that are mounted on the brackets 58 associated with drive levers 28, 30 and are electrically connected with the air pumps 102 associated with air cylinders 100. Each of the switches 124 has an actuating button 126 positioned within the path of travel of the lower end of the corresponding drive lever 28 or 30 so as to be depressed and thus open the circuit when levers 28, 30 are in their widespread position as illustrated in FIG. 8. When drive levers 28, 30 are in neutral or other positions within the longitudinal legs 36 of the T-slots 32, 34, the lower ends of drive levers 28, 30 are out of engagement with buttons 126, thereby allowing switches 124 to return to their normal closed conditions as illustrated in FIGS. 6 and 7.

Control circuit 96 also includes a storage battery 128 electrically connected with the pumps 102 and switches 124, and an ignition switch 130 that is positioned for access by the operator when seated on the mower. Ignition switch 130 must be closed in order to energize pumps 102. Because switches 124 are connected in parallel, at least one of them must also be closed to complete the circuit and energize pumps 102. Switches 124 could be connected in series relationship with one another, in which case both of them would need to be closed, along with ignition switch 130, before pumps 102 would be energized.

Operation

During mowing operations, drive levers 28, 30 are disposed within the longitudinal fore-and-aft legs 36 of T-slots 32, 34. This enables drive levers 28, 30 to be shifted independently of one another in appropriate fore-and-aft movements to control steering, speed and forward or reverse travel. Movement of levers 28, 30 forwardly from the neutral position illustrated in FIG. 1 causes the mower to move forwardly, while moving them rearwardly from the neutral position causes the mower to move rearwardly. Steering of the mower is accomplished by moving one of the levers 28, 30 more forwardly or reversely relative to the other lever.

During mowing operations, because ignition switch 130 is closed and drive levers 28, 30 are spaced away from actuating buttons 126 of switches 124, control circuit 96 is energized to keep brakes 72 released. This condition is illustrated in FIG. 14 wherein piston rods 104 are retracted within housings 106, overcoming the bias of tension springs 80 and releasing brakes 72. In reaching this condition, pumps 102 will have been energized to force air into housings 106 below pistons 103, causing them to rise in housings 106 until such time as a limit switch (not shown) is engaged and operated, which shuts off pumps 102 and closes a valve associated with exhaust port 112. This allows cylinders 100 to remain pressurized during mowing operations without requiring continuous operation of pumps 102.

When the mower is to be parked and dismounted, the operator places drive levers 28, 30 in their neutral positions aligned with transverse legs 38 of T-slots 32, 34 and then swings the levers out to their widespread positions of FIGS. 3 and 8. Such movement causes the lower ends of levers 28, 30 to engage and depress buttons 126 of switches 124, thereby opening the circuit and causing the valve (not shown) that controls exhaust ports 112 to open and quickly exhaust trapped air from the underside of the pistons within cylinders 100. This allows tension springs 80 to pull the outer ends of levers 88 upwardly, setting parking brakes 72 as illustrated in FIG. 13. The operator would then typically turn off the ignition to open switch 130.

It will be appreciated that the brakes 72 may also be set by simply turning off the ignition switch 130 (open the circuit) when the machine is running and the drive levers 28, 30 are in their operating modes within the longitudinal legs 36 of T-slots 32, 34. Thus, brakes 72 may be set by either placing the drive levers 28, 30 in neutral and swinging them out to their widespread positions, or by simply turning off the ignition through switch 130. Conversely, to release brakes 72, the ignition must be turned on through switch 130 and at least one of the drive levers 28, 30 swung inwardly to the operating mode within the longitudinal leg 36 of the T-slot 32 or 34.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. In a riding mower having a pair of independent drive wheels controlled by a corresponding pair of operator-manipulated drive levers said levers being movable independently of one another along parallel, fore-and-aft paths of travel between forward, neutral, and reverse drive modes and being movable outwardly away from one another to widespread positions when in the neutral mode, the improvement comprising:
   at least one retaining mechanism operable when actuated to prevent rotation of at least one of said wheels; and
   an electrical control circuit connected with said retaining mechanism in a manner to cause actuation of the retaining mechanism in response to the movement of at least one of the drive levers to said widespread position,
   said retaining mechanism including a member movable toward and away from an actuated position and a spring yieldably biasing the member toward said actuated position,
   said electrical control circuit including an electrically powered control device operable when energized to overcome the bias of said spring and release the retaining mechanism.

2. In a mower as claimed in claim 1,
   said electrical control circuit further including a switch electrically connected with the control device in a manner to control energizing and de-energizing of the control device,
   said switch being disposed for operation by said at least one drive lever to de-energize the control device when the drive lever is in the widespread position.

3. In a mower as claimed in claim 2,
   further comprising a pivoting bracket for each lever and a link operably coupled with the bracket for controlling the speed and direction of rotation of a corresponding drive wheel,
   each of said brackets supporting a corresponding drive lever for fore-and-aft movement of the lever along its path of travel,
   said switch being mounted on the bracket associated with said at least one lever for movement therewith.

4. In a mower as claimed in claim 3,
   each drive lever being pivotal supported on its bracket for movement toward and away from said widespread position.

5. In a mower as claimed in claim 1,
   said control device including a pneumatically operated component operably coupled with the spring in a manner to overcome the bias of the spring as a result of air pressure applied to the component.

6. In a mow as claimed in claim 5,
   said control device further including an electrically operated air pump operable when energized to supply air under pressure to said component, said control device further including an air exhaust port openable when said at least one drive lever is in the widespread position to release air pressure on said component.

7. In a mower as claimed in claim 1,
further comprising an engine, a pair of hydraulic pumps operated by said engine, and a pair of reversible hydraulic motors connected hydraulically with respective ones of said pumps for driving corresponding ones of the drive wheels.

8. In a mower as claimed in claim 1,
further comprising guide structure defining a generally T-shaped guide slot for each of said drive levers,
each guide slot having a longitudinal portion extending parallel to the fore-and-aft path of travel of the lever and a transverse portion extending transverse to said path of travel,
each guide slot being disposed such that a drive lever is movable within the longitudinal portion of the slot during fore-and-aft movement of the drive lever along said path of travel and within the transverse portion of the slot during movement of the drive lever toward and away from said widespread position,
said transverse portion of the slot preventing fore-and-aft movement of the drive lever when the drive lever is in the widespread position.

9. In a mower as claimed in claim 1,
there being a retaining mechanism for each of said drive wheels.

10. In a mower as claimed in claim 1,
said retaining mechanism comprising a friction brake assembly.

* * * * *